(12) United States Patent
Siripunkaw et al.

(10) Patent No.: US 8,493,987 B2
(45) Date of Patent: *Jul. 23, 2013

(54) DEVICE-TO-DEVICE COMMUNICATION AMONG CUSTOMER PREMISE EQUIPMENT DEVICES

(75) Inventors: Pak Siripunkaw, Sicklerville, NJ (US); Emery J. Weber, Denver, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/906,195

(22) Filed: Oct. 18, 2010

(65) Prior Publication Data
US 2011/0026536 A1    Feb. 3, 2011

Related U.S. Application Data

(63) Continuation of application No. 11/603,422, filed on Nov. 22, 2006, now Pat. No. 7,839,870.

(60) Provisional application No. 60/739,472, filed on Nov. 23, 2005, provisional application No. 60/791,803, filed on Apr. 13, 2006.

(51) Int. Cl.
*H04L 12/28* (2006.01)

(52) U.S. Cl.
USPC ........... 370/401; 370/235; 370/254; 370/389; 370/392; 709/217; 709/220; 709/223

(58) Field of Classification Search
USPC ............ 370/235–485; 709/202–223; 455/450
See application file for complete search history.

(56) References Cited

U.S. PATENT DOCUMENTS

| 6,529,910 B1 | 3/2003 | Fleskes |
| 7,484,234 B1 | 1/2009 | Heaton et al. |

(Continued)

OTHER PUBLICATIONS

EP Search Report 08846111, dated Feb. 7, 2011.
Office Action in U.S. Appl. No. 12/094,455, dated Oct. 26, 2011.

(Continued)

*Primary Examiner* — Yemane Mesfin
*Assistant Examiner* — Wanda Z Russell
(74) *Attorney, Agent, or Firm* — Banner & Witcoff, Ltd.

(57) ABSTRACT

A method of initializing, provisioning, and managing a cable modem and a customer premise equipment device includes sending a customized configuration file to the cable modem. The configuration file contains service provisioning information and further includes information indicative of a device-to-device communication configuration. A message is passed from the cable modem to the customer premise equipment device indicative of the device-to-device communication configuration. The customer premise equipment device is initialized for device-to-device communication with any other customer premise equipment devices in accordance with the device-to-device communication configuration indicated in the message, which relates to physical layer and data link layer communications among customer premise equipment devices. In this way, the customer premise equipment device knows how to communicate with other customer premise equipment devices, for example, at the same subscriber location.

20 Claims, 2 Drawing Sheets

U.S. PATENT DOCUMENTS

| | | |
|---|---|---|
| 7,836,092 B2 | 11/2010 | Alaniz et al. |
| 8,041,824 B1 | 10/2011 | Maeng |
| 8,042,132 B2 | 10/2011 | Carney et al. |
| 2002/0147819 A1 | 10/2002 | Miyakoshi et al. |
| 2004/0037316 A1 | 2/2004 | Choi et al. |
| 2004/0190699 A1 | 9/2004 | Doherty et al. |
| 2004/0226051 A1 | 11/2004 | Carney et al. |
| 2005/0078668 A1 | 4/2005 | Wittenberg et al. |
| 2005/0204168 A1 | 9/2005 | Johnston et al. |
| 2009/0063833 A1 | 3/2009 | Ho |
| 2010/0064356 A1 | 3/2010 | Johnston et al. |

OTHER PUBLICATIONS

ISR issued in PCT/US08/081422, mail date Dec. 23, 2008.
EP Search Report 08 84 6111, dated Feb. 7, 2011.
ISR issued in PCT/US06/45184, mail date Oct. 29, 2007.
International Preliminary Report on Patentability issued in PCT/US06/45184, mail date May 27, 2008.

DEVICE-TO-DEVICE COMMUNICATION AMONG CUSTOMER PREMISE EQUIPMENT DEVICES

CROSS-REFERENCE TO RELATED APPLICATIONS

This application is a continuation of, and claims the priority benefit of, U.S. patent application Ser. No. 11/603,422, filed Nov. 22, 2006, which claims the benefit of U.S. provisional application Ser. No. 60/739,472, filed on Nov. 23, 2005, and U.S. provisional application Ser. No. 60/791,803, filed on Apr. 13, 2006. The contents of all the foregoing applications are hereby incorporated by reference.

BACKGROUND OF THE INVENTION

1. Field of the Invention

The invention relates to a method of initializing, provisioning, and managing a cable modem and a customer premise equipment device. The invention further relates to device-to-device communication among customer premise equipment devices.

2. Background Art

The modern hybrid fiber coax (HFC) network in its typical implementation includes fiber from the head end to the local network fiber node, and includes coax cable for the final signal distribution through a neighborhood. Modern two-way HFC infrastructures are capable of sending gigabytes of data per second to small pockets of homes in a narrowcast way.

Product and service offerings over broadband networks, including cable networks, have expanded in recent years. The cable networks are now used for additional products and services, for example, many cable networks now offer high speed data service in addition to video programming. In the modern HFC network, head end infrastructure may include a cable modem termination system (CMTS) for providing data over cable services in addition to video quadrature amplitude modulation (QAM) infrastructure for providing video content. The video QAMs may connect to various content sources, while the CMTS connects subscribers to the provider network. The provider network may include a variety of infrastructure for providing various services. For example, the provider network may include Domain Name System (DNS) servers, dynamic host configuration protocol (DHCP) servers, voice over Internet protocol (VoIP) gateways and soft switches for connecting to phone networks, among other systems for providing services to subscribers. Further, advances in network technology allow some functionality to be provided from locations upstream or downstream of the traditional head end.

At a subscriber location, a cable modem and a customer premise equipment device such as a set-top box communicate with the head end over the HFC network. Traditionally, the cable modem utilizes known initializing and provisioning techniques to obtain a network address and establish a connection to the provider network. For example, the data-over-cable service interface specifications (DOCSIS) specify various protocols for managing the connection of a cable modem to a CMTS. In a traditional application, the cable modem can obtain an IP address in a known manner, and customer premise equipment connected to the HFC network through the cable modem may obtain an IP address, for example, by utilizing DHCP.

A subscriber location may have multiple customer premise equipment devices. For example, the subscriber location may have multiple set-top boxes. It may be desirable to allow device-to-device communication among the set-top boxes within the subscriber location. However, configuring the set-top boxes for this communication may be difficult. For example, in a situation where there are a plurality of cable modem/set-top box pairs within a subscriber residence, traditional approaches may be used to connect each set-top box to the head end. However, in order to allow device-to-device communication among the set-top boxes in the residence, the devices must be configured. Although existing specifications provide for the configuration of communications with the head end, the devices are configured independently without any provision for device-to-device communication within the residence.

For the foregoing reasons, there is a need for a method of initializing, provisioning, and managing a cable modem and a customer premise equipment device in which the customer premise equipment device is informed as to the proper device-to-device communication configuration for communications among customer premise equipment devices, for example, at the same subscriber location.

SUMMARY OF THE INVENTION

In accordance with the invention, a method of initializing, provisioning, and managing a cable modem and a customer premise equipment device is provided. The customer premise equipment device is connected to the cable modem. The cable modem is connected to a cable modem termination system (CMTS). The CMTS is connected to a provider network.

The method includes initializing the cable modem connection to the CMTS, providing the cable modem with a network address, and the cable modem receiving a cable modem configuration file from a network server. The configuration file contains service provisioning information. The cable modem passes certain contents of the configuration file to the CMTS, and the CMTS passes certain identifiers back to the cable modem. These initial steps for initializing and provisioning the cable modem may take place in any suitable way.

In accordance with the invention, the method further comprises passing a message from the cable modem to the customer premise equipment device indicative of a device-to-device communication configuration. According to the invention, the configuration file, in addition to containing service provisioning information, further includes information indicative of a device-to-device communication configuration. This further information may be included in a number of custom fields in the configuration file. Adding these custom fields to the configuration file as contemplated by the invention allows the configuration file to indicate the device-to-device communication configuration for the customer premise equipment device. The customer premise equipment device receives the message passed from the cable modem, and is initialized for device-to-device communication with any other customer premise equipment devices in accordance with the device-to-device communication configuration indicated in the message. This specified device-to-device communication configuration relates to physical layer and data link layer communications among customer premise equipment devices.

At the more detailed level, the invention comprehends additional features. In one aspect, the customer premise equipment device is a set-top box. The device-to-device communication configuration relates to physical layer and data link layer communications among set-top boxes. For example, the cable modem connection to the CMTS is initialized in any suitable way; however, the configuration file sent to the cable modem further includes information indicative of the device-to-device communication configuration, and this information is passed in a message from the cable modem to the set-top box. The configuration relates to physical layer and data link layer communications, and may include information such as a specified radio frequency for the device-to-device communications. The set-top box and the cable modem may be both embedded in a subscriber gateway.

In preferred embodiments of the invention, the cable modem has a hardware address, for example, a media access control (MAC) address. The device-to-device communication configuration indicated by information in the configuration file sent from the network server is based at least in part on the hardware address of the cable modem. That is, configuration files may be customized on a per-modem basis. For example, set-top boxes located at the same subscriber location may be given a common physical layer and data link layer configuration for device-to-device communications.

DETAILED DESCRIPTION OF THE PREFERRED EMBODIMENT

Figure 1:
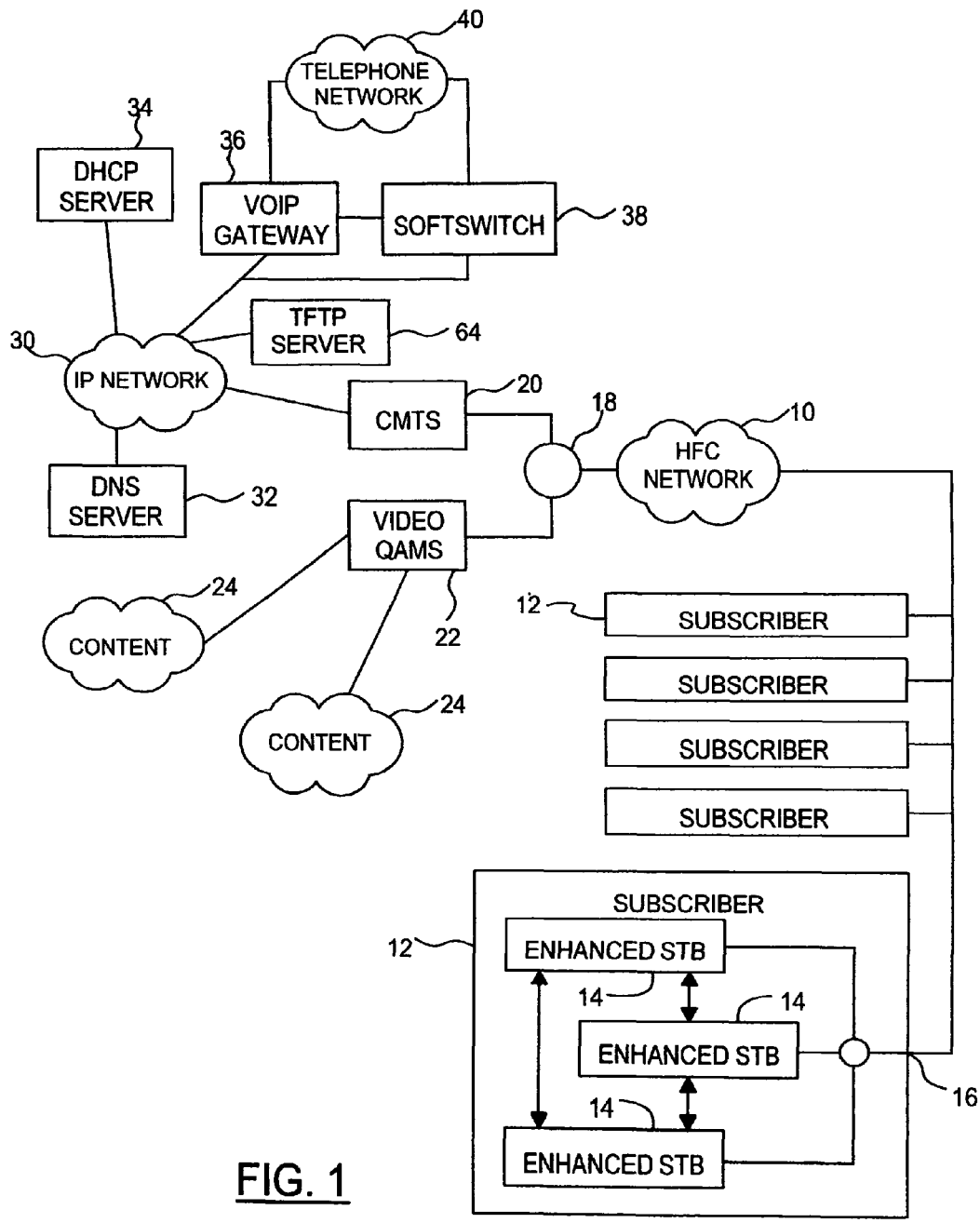
FIG. 1 illustrates a network diagram in accordance with a preferred embodiment of the invention.
Figure 2:
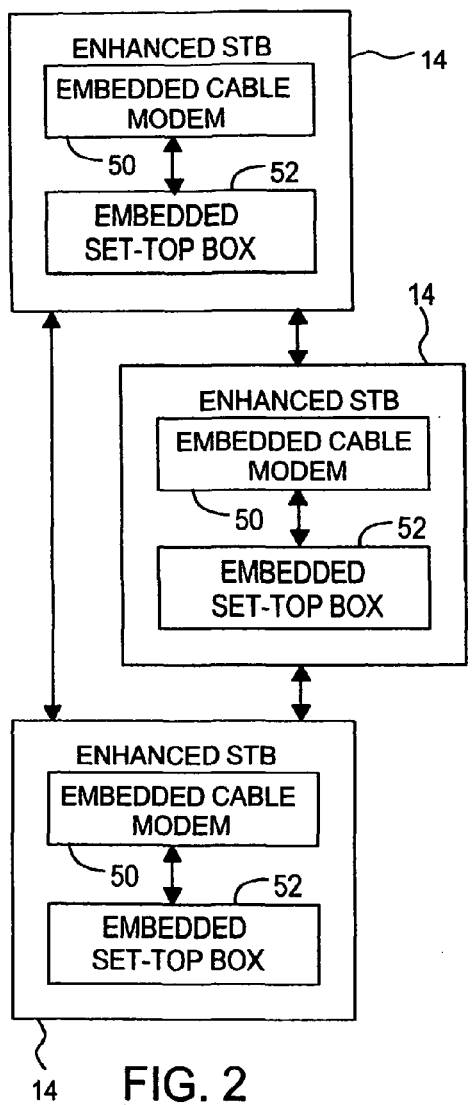
FIG. 2 illustrates multiple enhanced set-top boxes at a subscriber location, showing an embedded cable modem and embedded set-top box in each enhanced set-top box.

In FIG. 1, the hybrid fiber coax (HFC) network 10 provides service to a plurality of subscribers 12. Each subscriber 12 has one or more enhanced set-top boxes 14. An enhanced set-top box functions as a subscriber gateway, and includes an embedded cable modem 50 and an embedded set-top box 52 as shown in FIG. 2. The head end equipment includes cable modem termination system (CMTS) 20 and a plurality of video quadrature amplitude modulation (QAM) systems 22. Connector 18 illustrates the distribution of content from QAMs 22 and data over cable from CMTS 20 over HFC network 10. In general, the HFC forward path spectrum includes a plurality of channels. Video QAMs 22 provide programming on the channels. Some channels are reserved for data over cable connections provided by CMTS 20. Video QAMs 22 receive content from any number of sources such as content sources 24.

It is appreciated that the architecture for the head end may vary. In FIG. 1, CMTS 20 connects to the provider Internet protocol (IP) network 30. Various services are provided to the subscribers; IP network 30 includes the appropriate infrastructure for the needed services. As shown, the network may include Domain Name System (DNS) server 32, dynamic host configuration protocol (DHCP) server 34, and voice over Internet protocol (VoIP) gateway 36 and soft switch 38 for connecting to a telephone network 40. The various servers may be located at the head end, or may be located at other locations connected to the provider network 30. Also illustrated is trivial file transfer protocol (TFTP) server 64 which serves the configuration files.

Figure 3:
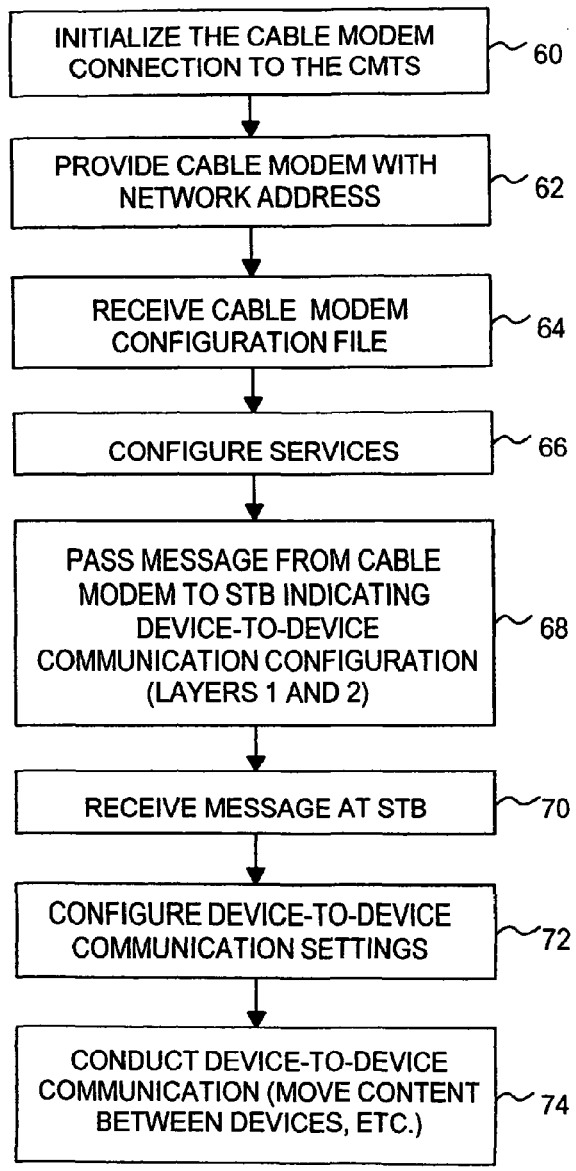
FIG. 3 illustrates initializing, provisioning, and managing a cable modem and a customer premise equipment device in the preferred embodiment of the invention.

With reference to FIGS. 1-3, a preferred embodiment of initializing, provisioning, and managing a cable modem and a customer premise equipment device is illustrated. The customer premise equipment device is depicted as an embedded set-top box 52, but may take other forms.

At block 60, the cable modem connection to the CMTS 20 is initialized. At block 62, the cable modem 50 is provided with a network address. In more detail, the cable modem is initialized and provisioned using a suitable technique such as known DOCSIS techniques. At block 64, the cable modem 50 receives the cable modem configuration file, for example, from trivial file transfer protocol (TFTP) server 64. At block 66, services are configured. At this point, the cable modem 50 has completed initialization, and is a manageable network element in the operator's IP network. This initialization process takes place for each cable modem at the subscriber location, and in the case of enhanced set-top boxes, this process takes place for each embedded cable modem.

Generally, the initializing and provisioning may take place according to DOCSIS standards or any other suitable approach involving a downloadable configuration file; however, in accordance with the invention, the configuration file sent to the cable modem includes service provisioning information and further includes information indicative of a device-to-device communication configuration for the embedded set-top box 52 (or other CPE device). More specifically, the device-to-device communication configuration relates to physical layer and data link layer communications among embedded set-top boxes 52 (or other CPE devices).

For example, the communication configuration may include information such as the electrical specification of signals (for example, frequency and coding) and frame structure for transferring frames from one host to another. The inclusion of this device-to-device communication configuration information in the configuration file is a customization to the configuration file in accordance with the invention that has many advantages. This customization may take place by, for example, adding custom fields to the configuration file. According to the invention, cable modem 50 passes a message to the set-top box 52 indicating the configuration. The message passing is indicated at block 68 in FIG. 2, which specifies that the configuration relates to layers 1 and 2 (physical and data link layers). The message passing may take any appropriate form. For example, a direct, dedicated connection between embedded cable modem 50 and embedded set-top box 52 may be used for the message passing. Depending on the application, other approaches may be appropriate, for example, when the CPE device is something other than an embedded set-top box.

At block 70, the message is received, and at block 72, the communication settings of the set-top box are configured.

It is appreciated that the invention, by customizing the configuration file, provides a way for the embedded set-top box or other CPE device behind the cable modem to be configured for device-to-device communication among other customer premise equipment devices or set-top boxes, particularly, at the same subscriber location.

At block 74, device-to-device communication is conducted, and includes moving content between devices. For example, video programming stored on one set-top box may be moved to another set-top box within the subscriber location.

In the exemplary embodiment of the invention, for each cable modem/CPE device pair, the communication configuration for the CPE device is related to the hardware address of the cable modem by the provider. Accordingly, the configuration file sent to a particular cable modem indicates the appropriate device-to-device communication configuration for the CPE device paired with the particular cable modem.

As best shown in FIG. 1, further steps may be taken to block upstream traffic toward the CMTS 20 with a filter 16. For example, a physical layer filter may be configured to block upstream traffic toward the CMTS 20 from the set-top boxes during device-to-device communications. Further, for example, a data link layer filter may be configured to block upstream traffic toward the CMTS 20 from the set-top boxes during device-to-device communication.

It is appreciated that embodiments of the invention may involve any suitable underlying initializing and provisioning technique, with a customized configuration file. Further, the cable modem and CMTS may take a variety of forms and the type of cable plant is not limited to coax cable or HFC arrangements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system, comprising:
a gateway communicatively coupled with a network and a plurality of user devices, wherein the gateway is configured to:
receive information from the network, the information comprising first configuration information for communications between the gateway and the network, and second configuration information for user device-to-user device communications;
configure itself for communication with the network according to the first configuration information; and
forward the second configuration information to one or more of the plurality of user devices, and
wherein at least one of the user devices is configured to receive the second configuration information, wherein the gateway comprises at least one of the user devices, and
wherein the gateway is further configured to transmit at least part of the second configuration information to at least two of the user devices to enable them to configure themselves for device-to-device communication accordingly.

2. The system of claim 1, wherein at least one of the plurality of user devices comprises a set-top box.

3. The system of claim 1, wherein the gateway comprises a cable modem and the network comprises a cable modem termination system.

4. The system of claim 1, wherein the gateway is further configured to:
receive the first and second configuration information from a termination system.

5. The system of claim 1, wherein the second configuration information comprises physical or data link layer configuration information.

6. The system of claim 1, wherein the second configuration information identifies a radio frequency to be used in the device-to-device communication.

7. The system of claim 1, wherein the second configuration information is based at least in part on an address associated with the gateway.

8. The system of claim 7, wherein the address comprises a media access control (MAC) address.

9. The system of claim 1, wherein the gateway is configured to forward the second configuration information to at least one of the plurality of user devices via a direct, dedicated connection between the gateway and the at least one of the plurality of user devices.

10. The system of claim 1, wherein the device-to-device communication comprises moving video programming stored on a first of the at least two of the user devices to a second of the at least two of the user devices.

11. The system of claim 1, further comprising:
a filter configured to block upstream traffic toward the network during the device-to-device communication.

12. A method comprising:
configuring a gateway for communication with a network according to first configuration information; and
forwarding second configuration information from the gateway to a plurality of user devices,
wherein at least one of the user devices is configured to receive the forwarded second configuration information, wherein the at least one of the user devices is located within the gateway, and
transmit at least part of the forwarded second configuration information to at least two of the user devices to enable them to configure themselves for device-to-device communication accordingly.

13. The method of claim 12, wherein at least one of the user devices comprises a set-top box.

14. The method of claim 12, wherein the gateway comprises a cable modem and the network comprises a cable modem termination system.

15. The method of claim 12, further comprising:
receiving, at the gateway, the first and second configuration information from the network.

16. The method of claim 12, wherein the second configuration information comprises physical or data link layer configuration information.

17. The method of claim 12, wherein the second configuration information is based at least in part on an address associated with the gateway.

18. A system, comprising:
a server device, configured to transmit first configuration information to a gateway; and
the gateway, configured to:
configure itself for communication with a network according to first configuration information; and
forward second configuration information from the gateway to a plurality of user devices,
wherein at least one of the user devices is configured to receive the forwarded second configuration information, wherein the at least one of the user devices is located within the gateway, and
transmit at least part of the forwarded second configuration information to at least two of the user devices to enable them to configure themselves for device-to-device communication accordingly.

19. The system of claim 18, wherein the second configuration information comprises physical or data link layer configuration information.

20. The system of claim 18, wherein the second configuration information is based at least in part on an address associated with the gateway.

* * * * *